(12) United States Patent
Yang et al.

(10) Patent No.: US 10,303,207 B2
(45) Date of Patent: May 28, 2019

(54) INTERLOCKING ASSEMBLY AND ELECTRONIC DEVICE HAVING THE SAME

(71) Applicant: ASUSTeK COMPUTER INC., Taipei (TW)

(72) Inventors: Ming-Hsing Yang, Taipei (TW); Kun-Hsiang Tsai, Taipei (TW); Yung-Hsiang Chen, Taipei (TW); Li-Wei Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/002,185

(22) Filed: Jun. 7, 2018

(65) Prior Publication Data

US 2018/0364755 A1 Dec. 20, 2018

(30) Foreign Application Priority Data

Jun. 14, 2017 (TW) .............................. 106119823 A

(51) Int. Cl.
*E05D 3/02* (2006.01)
*E05D 7/00* (2006.01)
*G06F 1/16* (2006.01)

(52) U.S. Cl.
CPC ........... *G06F 1/1616* (2013.01); *E05D 3/022* (2013.01); *E05D 7/00* (2013.01); *G06F 1/1681* (2013.01); *E05Y 2900/606* (2013.01)

(58) Field of Classification Search
CPC combination set(s) only.
See application file for complete search history.

(56) References Cited

U.S. PATENT DOCUMENTS

| 5,168,426 | A | * | 12/1992 | Hoving | G06F 1/1616 16/361 |
| 5,345,362 | A | * | 9/1994 | Winkler | A61N 1/37235 248/456 |
| 5,548,478 | A | * | 8/1996 | Kumar | G06F 1/162 16/223 |
| 5,742,475 | A | * | 4/1998 | Riddiford | G06F 1/1616 16/291 |
| 6,008,983 | A | * | 12/1999 | Yen | G06F 1/1616 248/917 |

(Continued)

FOREIGN PATENT DOCUMENTS

| TW | 201511650 A | 3/2015 |
| TW | M503734 U | 6/2015 |

(Continued)

*Primary Examiner* — Lisa Lea-Edmonds
(74) *Attorney, Agent, or Firm* — McClure, Qualey & Rodack, LLP

(57) ABSTRACT

An electronic device includes a support element, a second cover, a second guiding element and including a pushing element. The support element includes a first cover and a first guiding element. The first guiding element is connected to the first cover. The second guiding element is slidably jointed to the first guiding element to move relative to the first guiding element in a direction and is connected to the second cover. The pushing element is connected to the second cover and configured to push against the support when the second cover rotates relative to the second guiding element to make the support element move relative to the second guiding element.

14 Claims, 11 Drawing Sheets

(56) References Cited

U.S. PATENT DOCUMENTS

| | | | | |
|---|---|---|---|---|
| 6,028,768 A | * | 2/2000 | Cipolla | G06F 1/1616 |
| | | | | 361/679.12 |
| 6,532,147 B1 | * | 3/2003 | Christ, Jr. | G06F 1/1615 |
| | | | | 248/917 |
| 8,014,147 B2 | * | 9/2011 | Chen | G06F 1/1616 |
| | | | | 200/61.62 |
| 8,050,024 B2 | * | 11/2011 | Hsu | G06F 1/1616 |
| | | | | 248/917 |
| 8,300,394 B2 | * | 10/2012 | Senatori | G06F 1/1616 |
| | | | | 16/358 |
| 8,644,013 B2 | * | 2/2014 | Chung | G06F 1/1681 |
| | | | | 16/392 |
| 8,687,355 B2 | * | 4/2014 | Hsu | G06F 1/1624 |
| | | | | 248/285.1 |
| 8,749,965 B1 | * | 6/2014 | Lam | G06F 1/1681 |
| | | | | 361/679.27 |
| 9,354,669 B2 | | 5/2016 | Chen et al. | |
| 2014/0168878 A1 | * | 6/2014 | Jheng | G06F 1/1681 |
| | | | | 361/679.27 |
| 2014/0185224 A1 | * | 7/2014 | Chen | G06F 1/1622 |
| | | | | 361/679.27 |
| 2014/0340832 A1 | * | 11/2014 | Kwon | H04M 1/0216 |
| | | | | 361/679.27 |
| 2014/0376168 A1 | * | 12/2014 | Yang | G06F 1/1681 |
| | | | | 361/679.27 |
| 2015/0002998 A1 | * | 1/2015 | Arima | G06F 1/1637 |
| | | | | 361/679.27 |
| 2016/0054761 A1 | * | 2/2016 | Wolff | E05D 7/10 |
| | | | | 361/679.09 |

FOREIGN PATENT DOCUMENTS

| | | |
|---|---|---|
| TW | M531732 A | 11/2016 |
| TW | M531732 U | 11/2016 |

* cited by examiner

INTERLOCKING ASSEMBLY AND ELECTRONIC DEVICE HAVING THE SAME

CROSS-REFERENCE TO RELATED APPLICATION

This application claims the priority benefit of Taiwan application serial No. 106119823, filed on Jun. 14, 2017. The entirety of the above-mentioned patent application is hereby incorporated by reference herein and made a part of specification.

BACKGROUND OF THE INVENTION

Field of the Invention

The disclosure relates to a clamshell electronic device.

Description of the Related Art

With the development of technology, notebook computers are developed in a trend of lightness and shortness in order to be carried conveniently. However, the structure of the notebook computer leads to the operation between the upper cover and the lower cover being difficult in the light and thin structure configuration.

BRIEF SUMMARY OF THE INVENTION

According to a first aspect of the disclosure, an electronic device is provided. The electronic device comprises: a support element, including a first cover and a first guiding element, and the first guiding element is connected to the first cover; a second cover; a second guiding element, slidably jointed to the first guiding element to move relative to the first guiding element in a direction and connected to the second cover; a pushing element, connected to the second cover, configured to push against the support element when the second cover rotates relative to the second guiding element to make the support element move relative to the second guiding element.

According to a second aspect of the disclosure, an interlocking assembly is provided. The interlocking assembly comprises: a first guiding element; a second guiding element, slidably jointed to the first guiding element to move relative to the first guiding element in a direction; and a pushing element, jointed with the second guiding element and configured to push against the first guiding element when the pushing element relative to the second guiding element to make the first guiding element move relative to the second guiding element.

BRIEF DESCRIPTION OF THE DRAWINGS

In FIG. 1, a second cover is closed relative to a first cover, and in FIG. 2, the second cover is open relative to the first cover;

In FIG. 6A, the second cover is closed relative to the first cover, and in FIG. 6B, the second cover is opened with 30 degrees relative to the first cover, and in FIG. 6C, the second cover is opened with 135 degrees relative to the first cover.

DETAILED DESCRIPTION OF THE EMBODIMENTS

Figure 1:
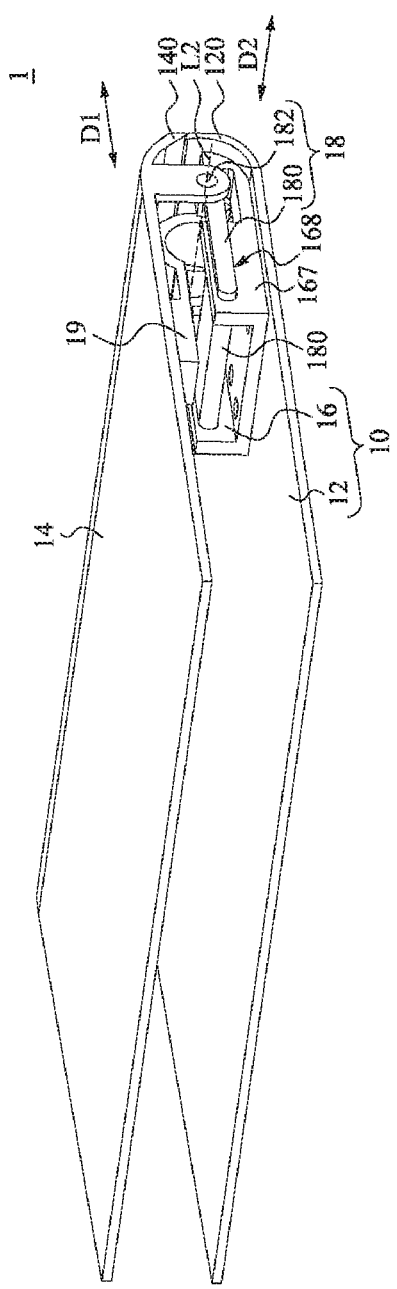
FIG. 1 and FIG. 2 illustrate stereograms of an electronic device in an embodiment, respectively.
Figure 2:
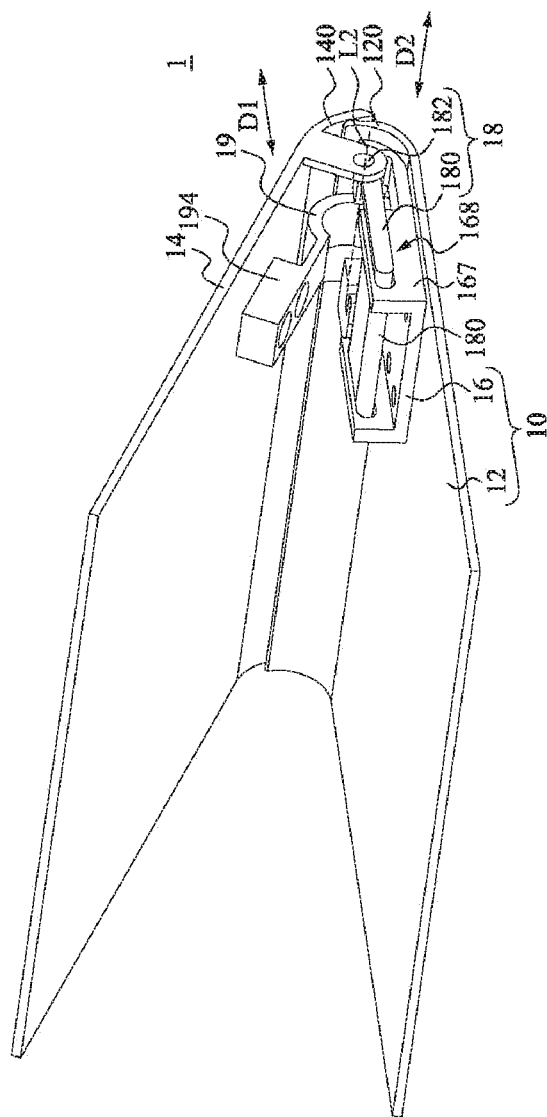
Figure 3:
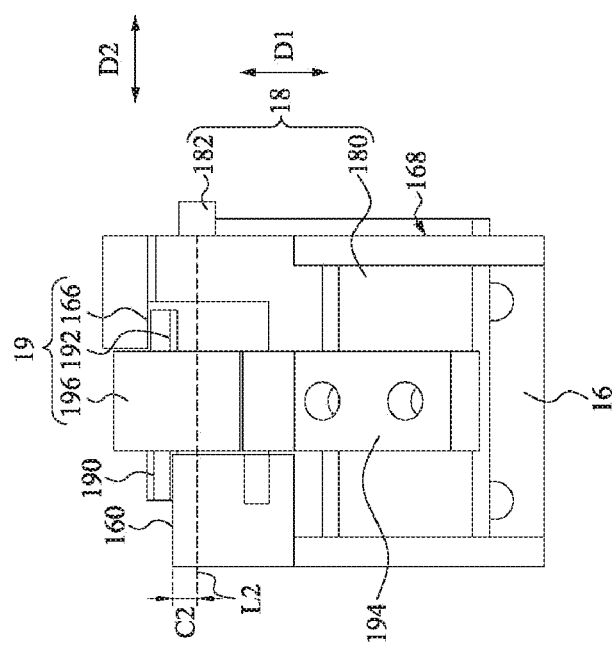
FIG. 3 is a top view of a part of the structure in FIG. 2, wherein the first cover and the second cover are omitted.

Please refer to FIG. 1, FIG. 2 and FIG. 3. FIG. 1 and FIG. 2 respectively illustrate stereograms of an electronic device 1 in an embodiment. In FIG. 1, a second cover 14 is closed relative to a first cover 12, and in FIG. 2, the second cover 14 is open relative to the first cover 12. FIG. 3 shows a top view of FIG. 2, and FIG. 3 omits the first cover 12 and the second cover 14 shown in FIG. 2.

In FIG. 1 and FIG. 2, an electronic device 1 includes a first cover 12, a first guiding element 16, a second cover 14, a second guiding element 18, and a pushing element 19. The first cover 12 of the electronic device 1 includes a first end 120 and the second cover 14 includes a second end 140. The first end 120 and the second end 140 are respectively located on one side of the pushing element 19 away from the first guiding element 16. Furthermore, the first end 120 is bent toward the second cover 14, and the second end 140 is bent toward the first cover 12. When the first cover 12 covers the second cover 14, the first end 120 is aligned with the second end 140.

In the embodiment, the first guiding element 16 is fixed on one side of the first cover 12 facing the second cover 14, so the first guiding element 16 and the first cover 12 form a support element 10. The first guiding element 16 has at least one side wall 167 (such as two as shown), a front abutment surface 160, and a rear abutment surface 166 (shown in FIG. 3). The side walls 167 are disposed on two sides of the first guiding element 16 and substantially parallel to each other. The side walls 167 are arranged in a direction D2, and extend toward the second cover 14 respectively. Each side wall 167 has a sliding slot 168. The sliding slots 168 of the first guiding element 16 are symmetrically disposed on the side walls 167 of the first guiding element 16 and respectively extend in a direction D1. The distance between the track centerline of any sliding slot 168 and the first cover 12 is substantially a certain value. In an embodiment, the distance between the track centerline of any of the sliding slots 168 and the first cover 12 gradually increases toward the first end 120. In another embodiment, the distance between the track centerline of any of the sliding slots 168 and the first cover 12 gradually decreases toward the first end 120.

In the embodiment, the front abutment surface 160 and the rear abutment surface 166 (shown in FIG. 3) of the first guiding element 16 are located between the sliding slot 168 and the first end 120 of the first cover 12. In the embodiment, the normal vectors of the front abutment surface 160 and the rear abutment surface 166 are substantially parallel to the direction D1, respectively. The front abutment surface 160 of the first guiding element 16 faces the second end 140 of the second cover 14, and the rear abutment surface 166 faces the sliding slot 168. In the direction D1, a distance between the front abutment surface 160 and the sliding slot 168 adjacent the front abutment surface 160 is less than a distance between the abutment surface 166 and the sliding slot 168 adjacent the abutment surface 166.

In the embodiment, the second guiding element 18 includes one end with a joint portion 182 and the other end with a slider 180. The joint portion 182 of the second guiding element 18 is connected to the second cover 14 based on a pivot axis L2 (shown in FIG. 3). The pivot axis L2 passes through the pivot joint part between the joint portion 182 of the second guiding element 18 and the second cover 14 along the direction D2. The direction D2 is substantially perpendicular to the direction D1. The joint portion 182 of the second guiding element 18 and the second cover 14 are configured to rotate around the pivot axis L2 as a rotation center line. In addition, the slider 180 of the second guiding element 18 passes through the two sliding slots 168 of the first guiding element 16 in the direction D2 and is disposed in the sliding slots 168 slidably to move in the direction D1 relative to the first guiding element 16.

Since the second guiding element 18 is connected with the second cover 14 and the first guiding element 16 is connected with the first cover 12, when the second guiding element 18 moves relative to the first guiding element 16 along the direction D1, the second cover 14 simultaneously moves relative to the first cover 12 along the direction D1. Optionally, in other embodiment, a sliding slot is disposed on the second guiding element 18, and a slider is correspondingly disposed on the first guiding element 16, whereby the first guiding element 16 moves in the direction D1 relative to the second guiding element 18 via the slider jointed to the sliding slot of the second guiding element 18. In other embodiments, any guiding manner that allows the second guiding element 18 to move relative to the first guiding element 16 along the direction D1 is applied to the present disclosure.

In FIG. 3, the pushing element 19 includes a fixing portion 194, an extending portion 196, a front pushing portion 190, and a rear pushing portion 192. The pushing element 19 is connected to the second cover 14 by the fixing portion 194 (shown in FIG. 2). The extending portion 196 of the pushing element 19 is connected with the fixing portion 194 and extends between the sliding slot 168 and the second end 140 of the second cover 14 (shown in FIG. 2). Since the pushing element 19 is connected with the second cover 14, the entire pushing element 19 rotates around the pivot axis L2 while the second cover 14 rotates around the pivot axis L2 as the rotation centerline.

Figure 4A:
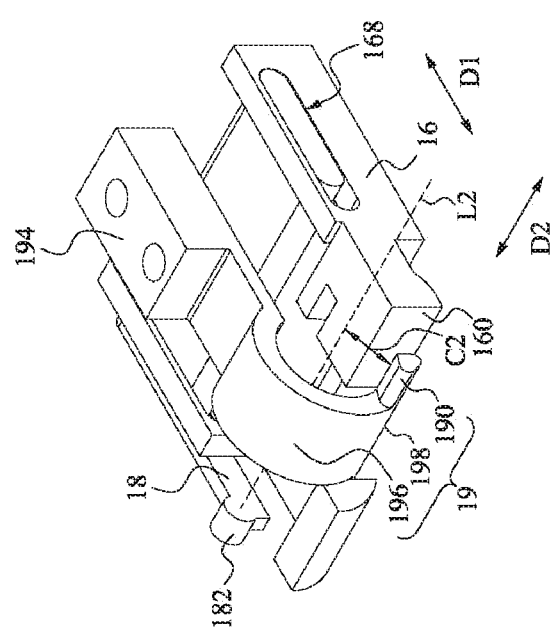
FIG. 4A and FIG. 4B respectively show stereogram views of partial structures in FIG. 1 and FIG. 2 at a viewing angle.

In the embodiment, the pushing element 19 has an extending end 198 (shown in FIG. 4A). The extending end 198 is located at an end of the extending portion 196 away from the fixing portion 194 of the pushing element 19. The front pushing portion 190 and the rear pushing portion 192 of the pushing element 19 are connected with the extending end 198 and protrude from the extending end 198 in the direction D2, respectively. The front pushing portion 190 and the rear pushing portion 192 are located on opposite sides of the extending end 198.

The front abutment surface 160 of the first guiding element 16 is located between the front pushing portion 190 and the pivot axis L2 (such as the junction between the second guiding element 18 and the first guiding element 16). The rotation centerline of the front pushing portion 190 is the pivot axis L2. The distance between the pivot axis L2 and the front pushing portion 190 is the shortest distance C2. In addition, the rear pushing portion 192 of the pushing element 19 is located between the rear abutting surface 166 and the pivot axis L2 of the first guiding element 16.

Figure 4B:
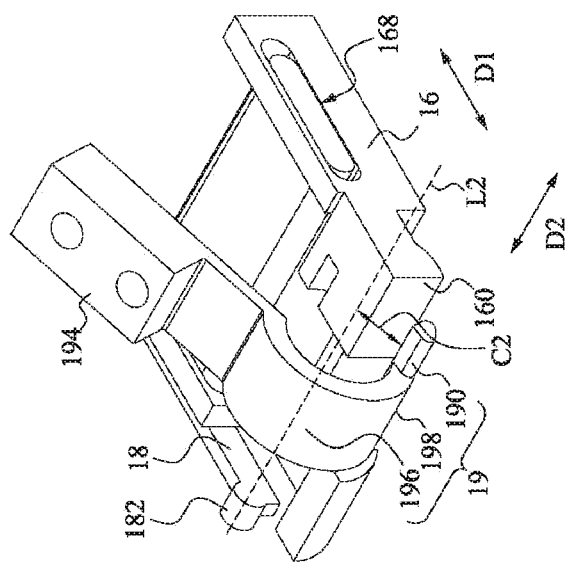

Please refer to FIG. 4A and FIG. 4B. FIG. 4A and FIG. 4B respectively show stereogram views of partial structures in FIG. 1 and FIG. 2 at a viewing angle. In the embodiment, when the second cover 14 rotates around the pivot axis L2 to move toward a direction away from the second guiding element 18 (shown in FIG. 2), the front pushing portion 190 of the pushing element 19 connected to the second cover 14 rotates around the pivot axis L2 to move toward a direction away from the second end 140 of the second cover 14. The front pushing portion 190 pushes the front abutment surface 160 of the first guiding element 16 to makes the second end 140 of the second cover 14 move away from the first guiding element 16. Since the second cover 14 is connected with the second guiding element 18, the second guiding element 18 limits the second cover 14 to move relative to the first guiding element 16 along the direction D1 when the second cover 14 moves relative to the first guiding element 16.

In the foregoing configuration, please refer back to FIG. 1 and FIG. 2. As shown in FIG. 1 and FIG. 2, while the second cover 14 rotates around the pivot axis L2 to move toward a direction away from the first cover 12 and the second guiding element 18, the second end 140 of the second cover 14 moves away from the first guiding element 16 along the direction D1 and moves to a side of the first end 120 away from the first guiding element 16. Therefore, when the second cover 14 covers the first cover 12, the second end 140 is aligned with the first end 120, and when the second cover 14 rotates away from the first cover 12, the second end 140 moves and rotates relative to the second end 140 to the side of the first end 120 away from the first guiding element 16 in a manner that the second end 140 does not interfere with the first end 120 and simultaneously rotates.

Accordingly, the appearance of the electronic device 1 is kept smooth when the second cover 14 covers the first cover 12 or the second cover 14 is opened relative to the first cover 12, and it is avoided forming a gap between the first end 120 of the first cover 12 and the second end 140 of the second cover 14 to prevent the external environment from polluting the internal space of the electronic device 1 through the gap. Moreover, the electronic device 1 can also prevent the first end 120 and the second end 140 from interfering with each other when the second cover 14 is opened relative to the first cover 12, thereby avoiding damage to the components caused by the collision between the first cover 12 and the second cover 14.

In another embodiment, during the second cover 14 rotates around the pivot axis L2 to move a direction away from the second guiding element 18, the pushing element 19 is configured to push against the structure of the first cover 12 instead of pushing against the front abutment surface 160 of the first guiding element 16, and the second end 140 of the second cover 14 can also be moved away from the first cover 12 along the direction D1, and moved to the side of the first end 120 away from the first guiding element 16.

Figure 5A:
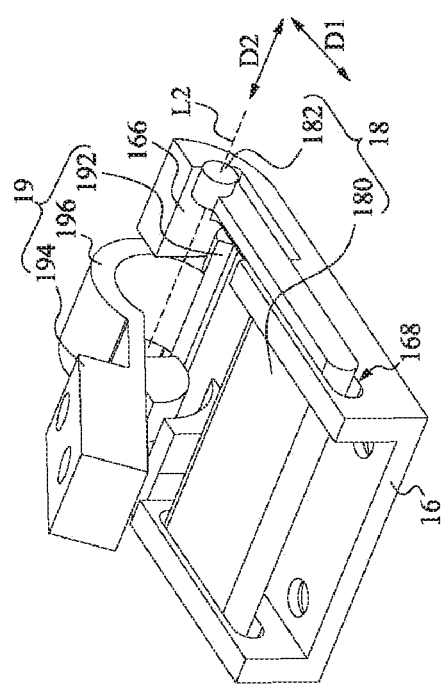
FIG. 5A and FIG. 5B respectively show stereogram views of structures in FIG. 4A and FIG. 4B at another viewing angle.
Figure 5B:
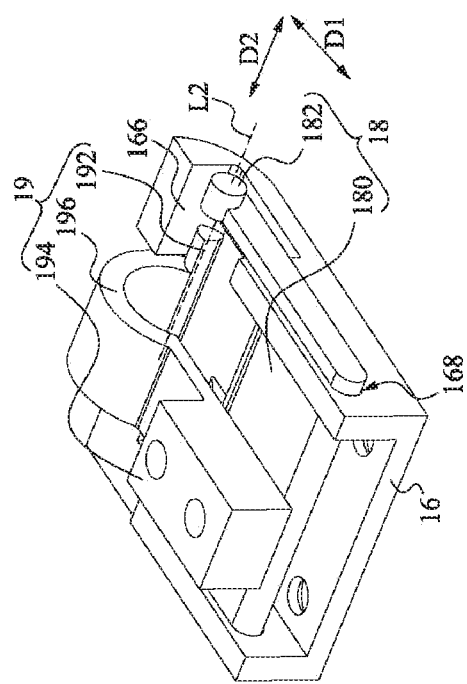

Please refer to FIG. 5A and FIG. 5B. FIG. 5A and FIG. 5B respectively show stereogram views of partial structures in FIG. 1 and FIG. 2 at another viewing angle, respectively. As shown in FIG. 5A and FIG. 5B, when the second cover 14 (shown in FIG. 2) rotates around the pivot axis L2 to get close the second guiding element 18, the rear pushing portion 192 of the pushing element 19 connected with the second cover 14 simultaneously rotates around the pivot axis L2 toward the second end 140 of the second cover 14 (as shown in FIG. 2). At the same time, the rear pushing portion 192 pushes the rear abutment surface 166 of the first guiding element 16, and then the second end 140 of the second cover 14 moved close to the first guiding element 16. Since the second cover 14 is connected with the second guiding element 18, when the second cover 14 moves relative to the first guiding element 16, the second guiding element 18 limits the second cover 14 to move relative to the first guiding element 16 along the direction D1.

In the foregoing structural configuration, while the second cover 14 rotates around the pivot axis L2 to get close to the first cover 12 and the second guiding element 18, the second end 140 of the second cover 14 moves along the direction D1 and gets close to the first guiding element 16 and moves to a side of the first end 120 near the first guiding element 16. When the second cover 14 covers the first cover 12, the second end 140 returns to the state of aligning with the first end 120.

In another embodiment, when the second cover 14 rotates around the pivot axis L2 to get close the second guiding element 18, the pushing element 19 is configured to push against the structure on the first cover 12 instead of pushing against the rear abutment surface 166 of the first guiding element 16, and the second end 140 of the second cover 14 can also be moved to close the first cover 12 along the direction D1 and moved to the side of the first end 120 closing the first guiding element 16 along with the rotation of the second cover 14.

Figure 5C:
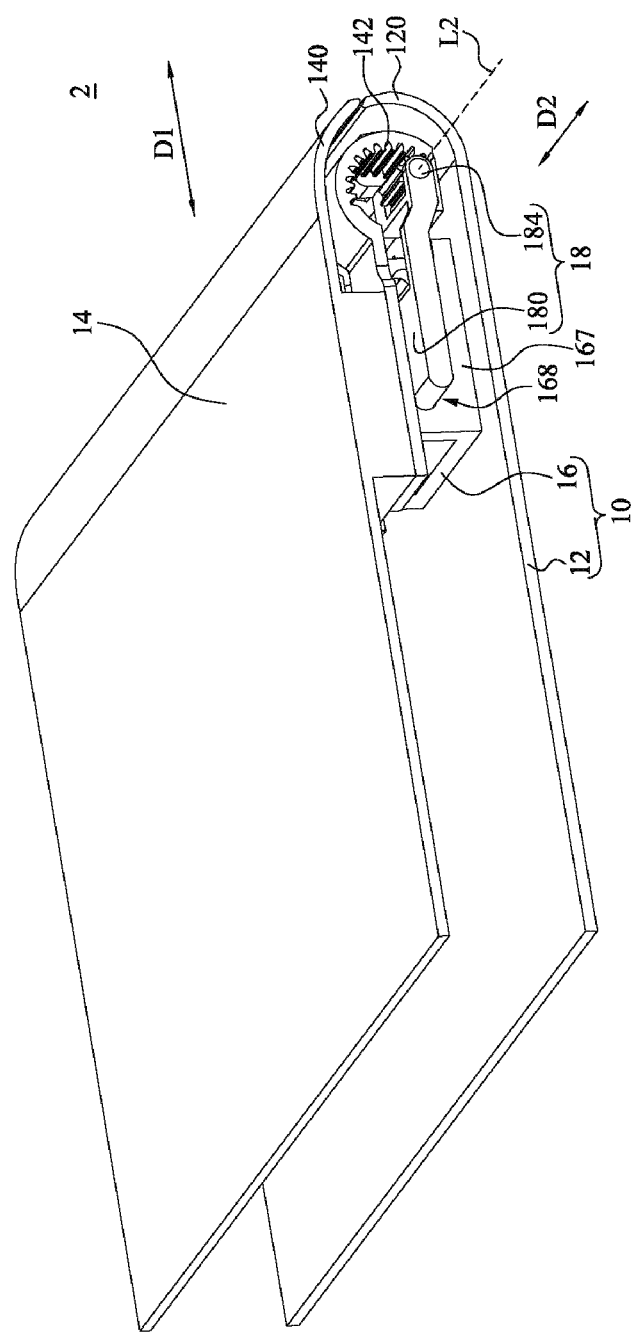
FIG. 5C is a stereogram of an electronic device in another embodiment.

In addition, any element that makes the second cover 14 rotate relative to the second guiding element 18 (shown in FIG. 1 and FIG. 2) is applied to instead the joint portion 182 in another embodiment. For example, please refer to FIG. 5C. FIG. 5C is a stereogram of an electronic device in another embodiment. As shown in FIG. 5C, an electronic device 2 of the present embodiment includes a first cover 12, a first guiding element 16, a second cover 14, a second guiding element 18, and a pushing element (not shown). The structure, function, and connection relationship among the elements are substantially as same as those of the electronic device 1 shown in FIG. 1 and FIG. 2, which is not described herein. The differences between the present embodiment and the embodiment shown in FIG. 1 and FIG. 2 are described herein. In the embodiment, the joint portion 182 shown in FIG. 1 and FIG. 2 is replaced with a shaft-less rotating pivot 184, and the second cover 14 further includes an external gear 142.

In FIG. 5C, the rotating pivot 184 is located at one end of the second guiding element 18, and the external gear 142 is fixing connected with the second cover 14 and is jointed with the rotating pivot 184 of the second guiding element 18. The rotating pivot 184 of the second guiding element 18 and the external gear 142 on the second cover 14 gear with each other to rotate around the pivot axis L2 and. In the foregoing structural configuration, when the second cover 14 rotates around the pivot axis L2 to get close to the first cover 12 and the second guiding element 18, the second end 140 of the second cover 14 moves towards the first guiding element 16 along the direction D1 and 140 moves to a side of the first end 120 closing the first guiding element 16. When the second cover 14 covers the first cover 12, the second end 140 returns to the state of aligning with the first end 120.

Figure 6A:
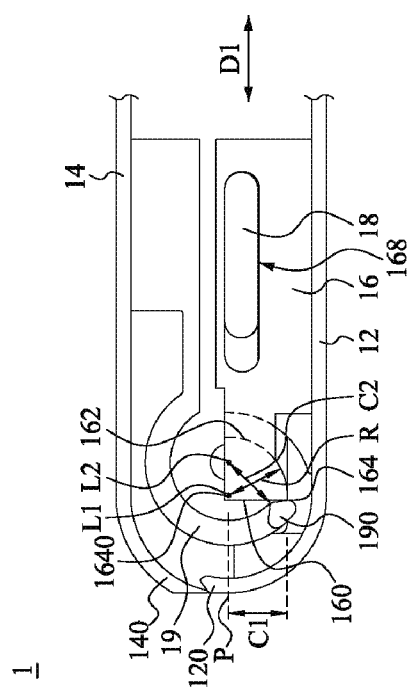
FIG. 6A, FIG. 6B, and FIG. 6C respectively illustrate a side view of an electronic device in an embodiment.
Figure 6B:
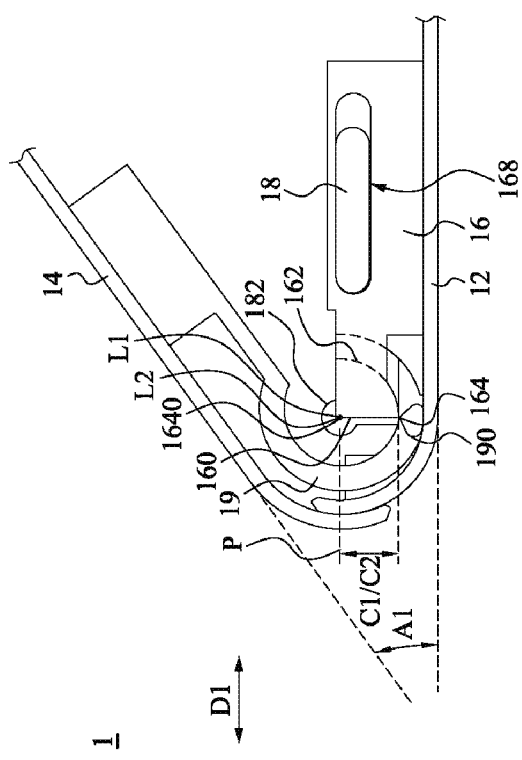
Figure 6C:
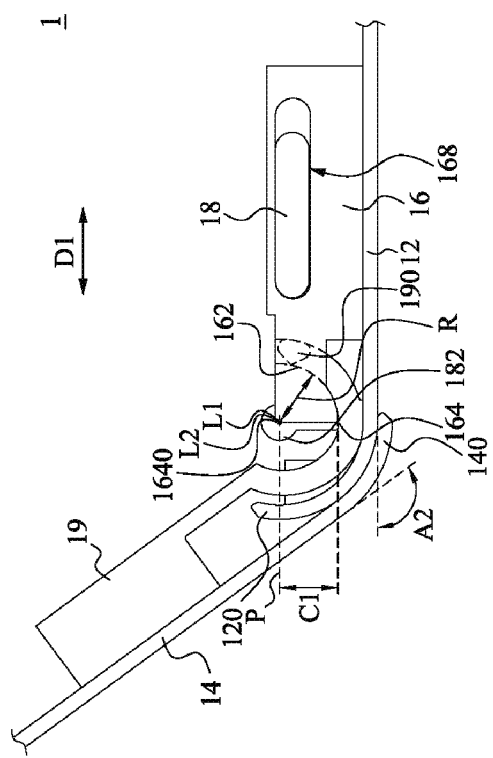

Please refer to FIG. 6A, FIG. 6B, and FIG. 6C. FIG. 6A, FIG. 6B, and FIG. 6C respectively illustrate a side view of an electronic device 1 in an embodiment. In FIG. 6A, the second cover 14 is closed relative to the first cover 12, and In FIG. 6B, the second cover 14 is opened with 30 degrees relative to the first cover 12, and in FIG. 6C, the second cover 14 is opened with 135 degrees relative to the first cover 12.

In FIG. 6A, the first guiding element 16 further includes a turning surface 162 and an edge 164. The turning surface 162 of the first guiding element 16 substantially faces the first cover 12. The turning surface 162 is connected with the front abutment surface 160 of the first guiding element 16 via the edge 164, and substantially extends from the edge 164 towards the sliding slot 168. In the embodiment, the turning surface 162 of the first guiding element 16 has a curvature centerline L1 and a curvature radius R.

In the embodiment, when the first guiding element 16 and the second guiding element 18 move relative to each other, the pivot axis L2 extends in the direction D1 to form a moving reference plane P. The edge 164 of the first guiding element 16 has a vertical projection 1640 on the moving reference plane P, and the vertical projection 1640 is located between the pivot axis L2 and the front pushing portion 190 of the pushing element 19. In the embodiment, the curvature centerline L1 of the turning surface 162 aligns with the vertical projection 1640 of the edge 164.

In addition, the distance between the edge 164 of the first guiding element 16 and the moving reference plane P is a vertical distance C1. The vertical distance C1 is substantially the same as the shortest distance C2 between the pivot axis L2 and the front pushing portion 190. In the embodiment, the curvature radius R of the turning surface 162 is equal to the vertical distance C1. The distance between any point on the turning surface 162 of the first guiding element 16 and the vertical projection 1640 is equal to the curvature radius R of the turning surface 162. In other embodiments, the distance between any point on the turning surface 162 and the vertical projection 1640 is less than or equal to the vertical distance C1.

In the foregoing structural configuration, when the second cover 14 is rotating around the pivot axis L2 to move toward the direction away from the second guiding element 18, and the angle between the first cover 12 and the second cover 14 is smaller than an angle A1 (shown in FIG. 6B), the front pushing portion 190 is pushed against the front abutment surface 160 of the first guiding element 16 to make the second end 140 of the second cover 14 rotate and move to a side of the first end 120 away from the first guiding element 16. In contrast, the pivot axis L2 of the second cover 14 moves along the moving reference plane P and gets close to the first end 120. Therefore, the pivot axis L2 gradually approaches the vertical projection 1640 of the edge 164 on the moving reference plane P.

In FIG. 6B, when the second cover 14 rotates until its pivot axis L2 aligns with the vertical projection 1640, the angle between the first cover 12 and the second cover 14 is substantially equal to the angle A1. And the front pushing portion 190 of the pushing element 19 is in contact with the edge 164 of the first guiding element 16. In the embodiment, the angle A1 is 30 degrees. In practical applications, any suitable angle is applied to the disclosure. Since the rotation center line of the front pushing portion 190 is the pivot axis L2, the distance between the front pushing portion 190 and the pivot axis L2 is the shortest distance C2. The shortest distance C2 is substantially the same as the vertical distance C1 between the edge 164 and the vertical projection 1640. Therefore, the front pushing portion 190 does not push against the first guiding element 16.

In FIG. 6C, after the second cover 14 rotates relative to the second guiding element 18 to make the front pushing portion 190 pass through the edge 164, the angle A2 between the first cover 12 and the second cover 14 is greater than the angle A1. In the embodiment, the angle A2 is 135 degrees. In practical applications, any suitable angle is applied. Since the curvature centerline L1 of the turning surface 162 is located on the vertical projection 1640 of the edge 164, and the curvature radius R of the turning surface 162 is equal to the vertical distance C1. The distance between any point on the turning surface 162 of the first guiding element 16 and the vertical projection 1640 is equal to the vertical distance C1. In this way, the front pushing portion 190 of the pushing element 19 does not push against the turning surface 162 of the first guiding element 16.

In the foregoing structural configuration, when the second cover 14 continually rotates away from the second guiding element 18, the front pushing portion 190 of the pushing element 19 is located between the turning surface 162 and the first cover 12 and rotating toward a direction away from the first cover 12. Therefore, the second end 140 of the second cover 14 does not move away from the first guiding element 16 in the direction D1, but only rotates with the second cover 14 at the side at the first end 120 away from the first guiding element 16.

In the embodiment, the first guiding element 16, the second guiding element 18, and the pushing element 19 of the electronic device 1 are considered as an interlocking assembly. The pushing element 19 is connected with the second guiding element 18 via the second cover 14. However, application of the interlocking assembly is not limited to the electronic device 1 disclosed in the embodiment. In an embodiment, any configuration of multiple elements requiring simultaneous relative rotation and relative movement is applied to the interlocking assembly of the present disclosure.

In sum, while the second cover rotates away from the first cover and the second guiding element, the second end of the second cover moves toward a direction away from the first guiding element and moves to a side of the first end away from the first guiding element along with rotation of the second cover. Therefore, when the second cover covers the first cover, the second end is aligned with the first end, and when the second cover rotates away from the first cover, the second end does not interfere with the first end and simultaneously rotates to the side of the first end away from the first guiding element. The appearance of the electronic device is kept smooth when the second cover covers the first cover or the second cover is opened relative to the first cover, and it is avoided forming a gap between the first end of the first cover and the second end of the second cover to prevent the internal space of the electronic device 1 from being polluted by the external environment through the gap. Moreover, the electronic device can also prevent the first end and the second end from interfering with each other, thereby avoiding damage to the components caused by the collision between the first cover and the second cover.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
    a support element, including a first cover and a first guiding element, and the first guiding element is connected to the first cover;
    a second cover;
    a second guiding element, slidably jointed to the first guiding element to move relative to the first guiding element in a direction and connected to the second cover;
    a pushing element, connected to the second cover and configured to push against the support element when the second cover rotates relative to the second guiding element, to make the support element move relative to the second guiding element.

2. The electronic device according to claim 1, wherein the first cover and the second cover includes a first end and a second end, respectively, the first end and the second end are respectively located on one side of the pushing element away from the first guiding element, when the first cover covers the second cover, the first end is aligned with the second end.

3. The electronic device according to claim 2, wherein when the second cover rotates relative to the second guiding element to make the pushing element push against the support element, the second end moves along the direction to be away from the first guiding element and moves to the side of the first end away from the first guiding element as the second cover rotates.

4. The electronic device according to claim 1, wherein the pushing element includes a front pushing portion, the first guiding element includes a front abutment surface located between the front pushing portion and a junction between the second guiding element and the first guiding element, and the front abutment surface is pushed by the front pushing portion.

5. The electronic device according to claim 4, wherein the first guiding element further includes a turning surface, the turning surface is connected with the front abutment surface via an edge, after the second cover rotates relative to the second guiding element to make the front pushing portion pass through the edge, the front pushing portion is located between the turning surface and the first cover.

6. The electronic device according to claim 5, wherein the second guiding element is jointed with the second cover based on a
    pivot axis, a moving reference plane formed by extending the pivot axis in the direction, wherein the edge has a vertical distance between it and the moving reference plane, and has a vertical projection on the moving reference plane, and a distance between the turning surface and the vertical projection is less than or equal to the vertical distance.

7. The electronic device according to claim 5, wherein the turning surface has a curvature centerline and a radius of curvature, a shortest distance exists between the pivot axis and the front pushing portion, wherein the curvature centerline is on the moving reference plane, and the shortest distance is equal to the radius of curvature of the turning surface.

8. The electronic device according to claim 5, wherein when an angle between the first cover and the second cover is smaller than a particular angle, the front pushing portion abuts against the front abutment surface, when an angle between the first cover and the second cover is greater than the particular angle, the front pushing portion is located between the turning surface and the first cover.

9. The electronic device according to claim 1, wherein the first guiding element includes a rear abutment surface, the pushing element comprises a rear pushing portion located between the rear abutment surface and a junction between the second guiding element and the first guiding element, and the rear abutment surface is pushed by the rear pushing portion.

10. The electronic device according to claim 1, wherein the first guiding element comprises at least one sliding slot extending in the direction, the second guiding element comprises a slider slidably disposed in the sliding slot.

11. An interlocking assembly, applied to an electronic device, comprising:
- a first guiding element;
- a second guiding element, slidably jointed to the first guiding element to move relative to the first guiding element in a direction; and
- a pushing element, jointed with the second guiding element and configured to push against the first guiding element when the pushing element rotates relative to the second guiding element to make the first guiding element move relative to the second guiding element.

12. The interlocking assembly according to claim 11, wherein the pushing element comprises a front pushing portion, the first guiding element includes a front abutment surface located between the front pushing portion and a junction between the second guiding element and the first guiding element, and the front abutment surface is pushed by the front pushing portion.

13. The interlocking assembly according to claim 11, wherein the first guiding element includes a rear abutment surface, the pushing element comprises a rear pushing portion located between the rear abutment surface and a junction between the second guiding element and the first guiding element, and the rear abutment surface is pushed by the rear pushing portion.

14. The interlocking assembly according to claim 11, wherein the first guiding element comprises at least one sliding slot extending in the direction, the second guiding element comprises a slider slidably disposed in the sliding slot.

* * * * *